United States Patent
Hughes et al.

(10) Patent No.: US 12,531,951 B1
(45) Date of Patent: Jan. 20, 2026

(54) METHOD FOR RESOLUTION ERROR DETECTION IN PRINT DEVICE USING ITERATIVE TRANSFORM

(71) Applicant: Xerox Corporation, Norwalk, CT (US)

(72) Inventors: Ethan Weston Hughes, Seattle, WA (US); Stuart A. Schweid, Pittsford, NY (US); John T. Newell, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 187 days.

(21) Appl. No.: 18/418,794

(22) Filed: Jan. 22, 2024

(51) Int. Cl.
| | |
|---|---|
| *H04N 1/00* | (2006.01) |
| *G06T 3/147* | (2024.01) |
| *G06T 7/00* | (2017.01) |
| *H04N 1/393* | (2006.01) |

(52) U.S. Cl.
CPC ......... *H04N 1/00082* (2013.01); *G06T 3/147* (2024.01); *G06T 7/001* (2013.01); *H04N 1/00005* (2013.01); *H04N 1/00034* (2013.01); *H04N 1/00068* (2013.01); *H04N 1/3935* (2013.01); *G06T 2207/20016* (2013.01); *G06T 2207/20061* (2013.01); *G06T 2207/20076* (2013.01); *G06T 2207/30144* (2013.01); *G06T 2207/30168* (2013.01)

(58) Field of Classification Search
CPC ........... H04N 1/00082; H04N 1/00005; H04N 1/00034
See application file for complete search history.

(56) References Cited

U.S. PATENT DOCUMENTS

| | | | |
|---|---|---|---|
| 8,385,647 B2 | 2/2013 | Hawley et al. | |
| 11,673,393 B1 | 6/2023 | Sambhy et al. | |
| 2007/0172148 A1* | 7/2007 | Hawley | G06V 10/48 |
| | | | 382/281 |
| 2010/0215287 A1* | 8/2010 | Jeon | G06V 10/753 |
| | | | 345/157 |
| 2021/0116434 A1 | 4/2021 | De Beenhouwer et al. | |

FOREIGN PATENT DOCUMENTS

WO 2007002964 1/2007

OTHER PUBLICATIONS

Li et al., "Vanishing point detection using cascaded 1D Hough Transform from single images," Pattern Recognition Letters, 33:11, 8 pages (2012).
Wang et al., "Detection and Measurement of Fetal Abdominal Contour in Ultrasound Images via Local Phase Information and Iterative Randomized Hough Transform," Frontiers in Biomedical Engineering and Biotechnology—Proceedings of the 2nd International Conference on Biomedical Engineering and Biotechnology, Oct. 11-13, 2013, Wuhan China, 1 page abstract (published 2014).

\* cited by examiner

*Primary Examiner* — Ibrahim Siddo
(74) *Attorney, Agent, or Firm* — Fox Rothschild LLP

(57) ABSTRACT

Methods of identifying and measuring resolution error in a print device are disclosed. The methods include processing a scan of a document on which targets are printed at known reference locations. The system identifies and performs a 1D Hough transform process on each of the targets. In the process, the system measures differences between an identified location for each target and an expected location for each target. The system then uses the difference to measure the document's image resolution and estimate resolution error, if any, in the document.

20 Claims, 9 Drawing Sheets

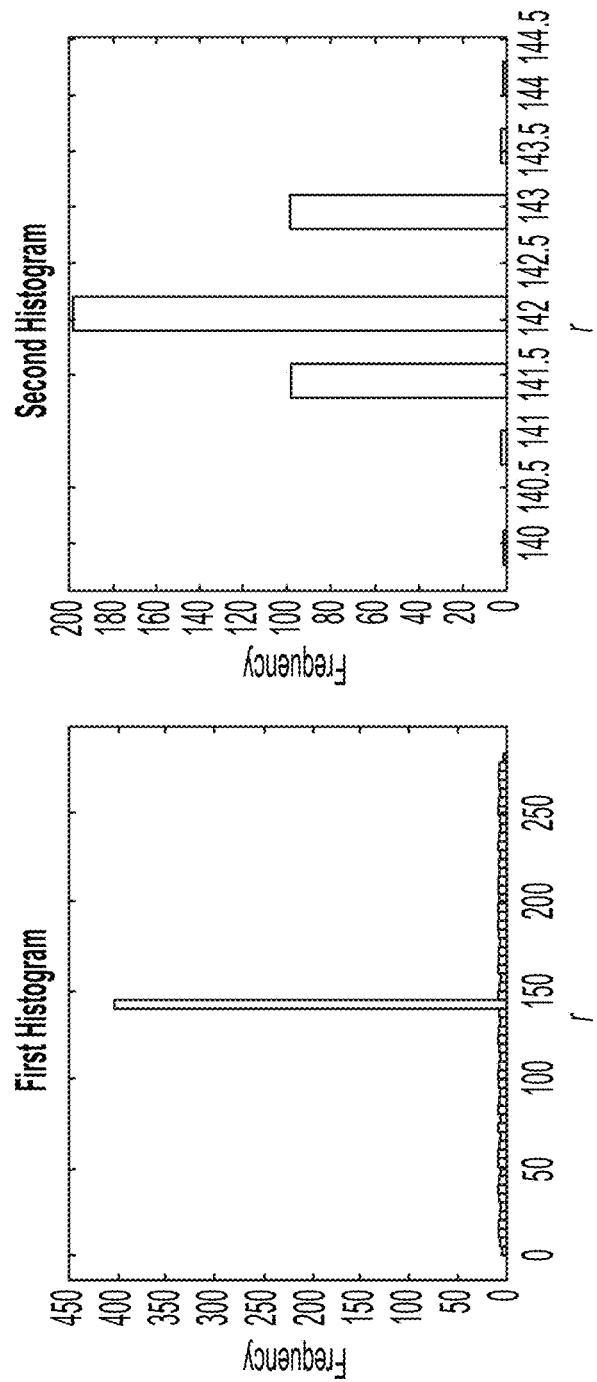

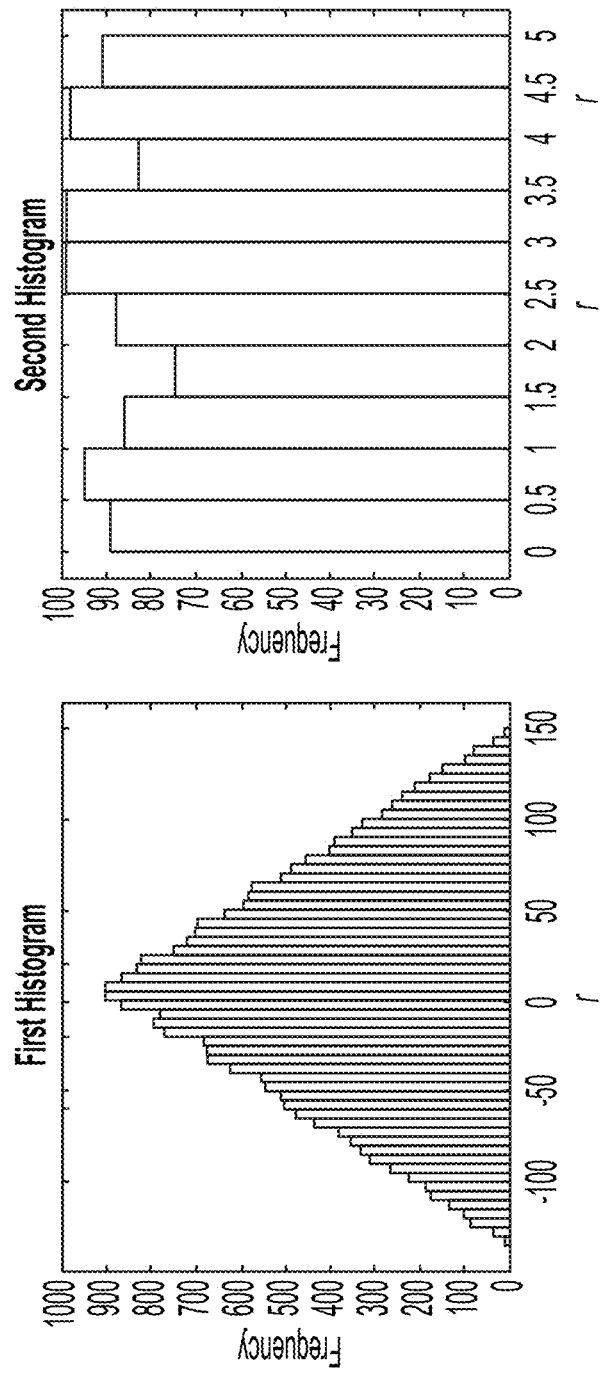

METHOD FOR RESOLUTION ERROR DETECTION IN PRINT DEVICE USING ITERATIVE TRANSFORM

BACKGROUND

When a print device prints or scans a document, to provide proper image the entire document should be printed or scanned at a consistent resolution. However, as the substrate moves through the print device, the speed at which a substrate moves through the device may deviate from an expected speed. Some variations may occur when processing documents of different sizes or thicknesses, or over time as parts of the device wear or accumulate dirt. Variations can even occur sometimes during printing of a single print job, as the various pages of a document, or even different portions of a single page, move through the device at different speeds.

Both printing and scanning activities incorporate an expected document resolution. However, when variations in speed occur, the resolution also will vary. This can lead to degradation in quality of a printed image and/or digital scan file.

Errors in resolution caused by machine speed variation can also cause errors in other document processing functions such as edge detection and fiducial detection. If the scanner of a print device is using edge detection to process a multiple page document, it may not properly detect an edge of a second page if the second page has a different effective resolution than that of a first page. In addition, print devices often look for fiducial markings on a document in order to register an image to the page of the document, or to identify a type of image that is printed on the page. If the image's resolution is not what the system expects, the system may not properly detect the fiducial markings.

This document describes methods and systems that are directed to addressing the issues described above.

SUMMARY

Method, systems and computer program products for identifying resolution error in a print device are disclosed. The method includes, by a processing device: (a) processing a scan of a document comprising an image with a plurality of targets printed at known reference locations on a substrate; (b) locating the targets in the image; (c) for each of the targets, performing a 1D Hough transform process that comprises performing a plurality of 1D Hough transformations to generate a plurality of lines, identifying a location where the plurality of lines intersect, measuring a difference between the identified location and a reference location, wherein the reference location is an expected location for the target, using the difference to measure a resolution of the image, and estimating an error value between the measured resolution and an expected resolution of the image; and (d) using the estimated error value to estimate a resolution error of a print device that printed the document.

BRIEF DESCRIPTION OF THE DRAWINGS

FIGS. 6A and 6B illustrate a two-histogram method of determining an r-value for a target in an image with no resolution error.

FIGS. 7A and 7B illustrate a two-histogram method of determining an r-value for a target in an image that exhibits resolution error or other noise.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." In this document, when terms such as "first" and "second" are used to modify a noun, such use is simply intended to distinguish one item from another, and it is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1:
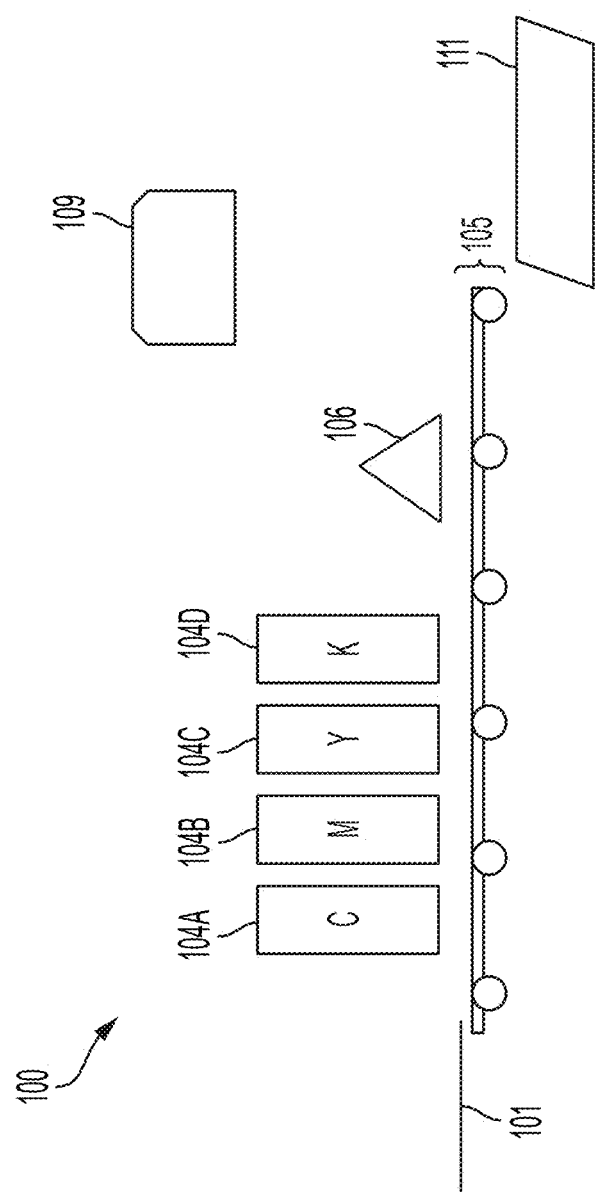
FIG. 1 illustrates example elements of a print device.

FIG. 1 illustrates example elements of a print device 100. The print device 100 includes a transport system 105 that includes belts, rollers and/or other movable actuators that are configured to carry a substrate 101 through the device. The print device also includes one or more print heads 104A-104D (which this document may collectively referred to as print heads 104). Each print head 104 includes or is connected an ink or toner applicator that can print ink or toner on the substrate. As shown, the print heads 104 are the cyan, magenta, yellow and key (black) print heads of an inkjet printer. However, other types of print heads and ink colors may be used, such as those found in laser printers and thermal printers. The print device also may include or be communicatively connected with a controller 109 or other computing device that includes a processor and a memory device. If the print device 100 includes scanning or faxing capabilities, then the print device 100 also may include an optical sensor 106 that can scan the document and, using the processor and programming instructions stored in the memory device, create a digital image file that can contains the document and can be used to render the document at a later time and/or on a different print device or a display device.

The transport system 105 may be a single-sided transport system as shown, and if so it will move the substrate through the device in a forward and/or reverse direction. In FIG. 1, the directions will be from left to right or right to left. In some embodiments, the transport system 105 may include a duplex path that turns the substrate 101 over so that both sides of the substrate can be printed and/or scanned.

After a document is printed, it may be delivered to and received by a receptacle 111. which holds documents until they are collected. Before the printed sheets reach the receptacle 111, they may pass by the optical sensor 106. The optical sensor 106 may generate image data of the printed sheets. This image data may then be analyzed by the controller 109 or another computing device to implement the processes that will be described below. The controller 109 may execute programming instructions to detect resolution error and take action, such as adjust operation of the print device, to correct the error as described below.

As mentioned in the Background section above, when a substrate moves through a print device, the speed at which a substrate moves through the device may vary. These variations can be caused by a variety of reasons, such as variations in size or thickness of the substrate, variations in power delivered to the device, the buildup of dirt or other materials in the device since a previous cleaning cycle, or any type of noise introduced into the system while it processes a document. These variations in machine speed can cause the resolution of a printed or scanned document to vary, as machine speed and resolution are related, such as in the following way:

$$\text{scanner rate} = k \text{ samples/second,} \quad (1)$$

$$\text{speed} = N \text{ mm/second,} \quad (2)$$

$$\text{resolution} = \frac{\text{scanner rate}}{\text{speed}} \text{ samples/mm.} \quad (3)$$

(The equations above use the units of millimeters and seconds to measure length and time by way of example. In various embodiments, other units of length and time may be used.)

To identify and address resolution errors that result from machine speed variation, the methods described in this document place reference markings (sometimes referred to in this document as "targets") in the image. An iterative one-dimensional (1D) Hough transform is then performed on the image. The Hough transform is an algorithm that is sometimes used in image processing and analysis to perform functions such as edge detection, shape detection, image segmentation and image registration. For edge or line detection, the Hough transform can be represented as:

$$r = x \cos \theta + y \sin \theta \quad (5).$$

where r is the distance from the origin to the closest point on the straight line, and θ is the angle between the x-axis and a vector normal to the line.

Figure 2:
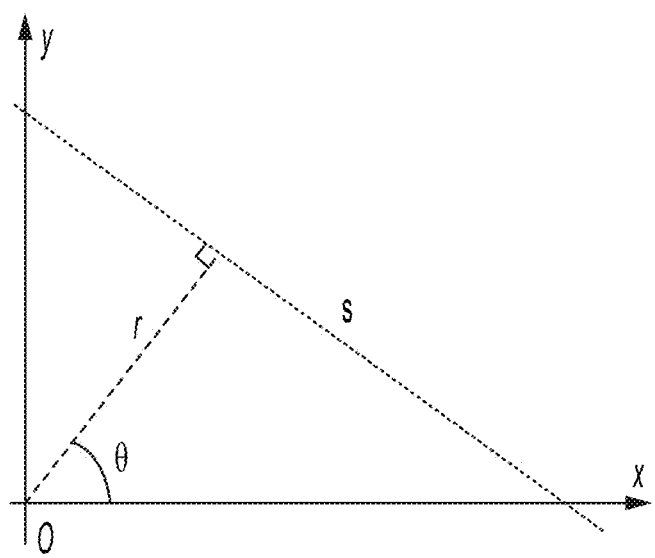
FIG. 2 illustrates an example (r, θ) for a single line in Hough space.

Each datum (i.e., any reference point) in an image contains a set of straight lines that pass through it. In a plane known as "Hough space," each such straight line can be represented as (r, θ). This is shown by way of example in FIG. 2, in which the reference point is any location along straight line s. The line having length r extends at a right angle from and with respect to straight line s to O, which here is the intersection of an x-axis and a y-axis (such as the bottom left corner of the image). A line having length r is positioned at an angle θ with respect to the x-axis. The set of all r for all straight lines that can pass through a reference point corresponds to a sinusoidal curve.

Figure 3:
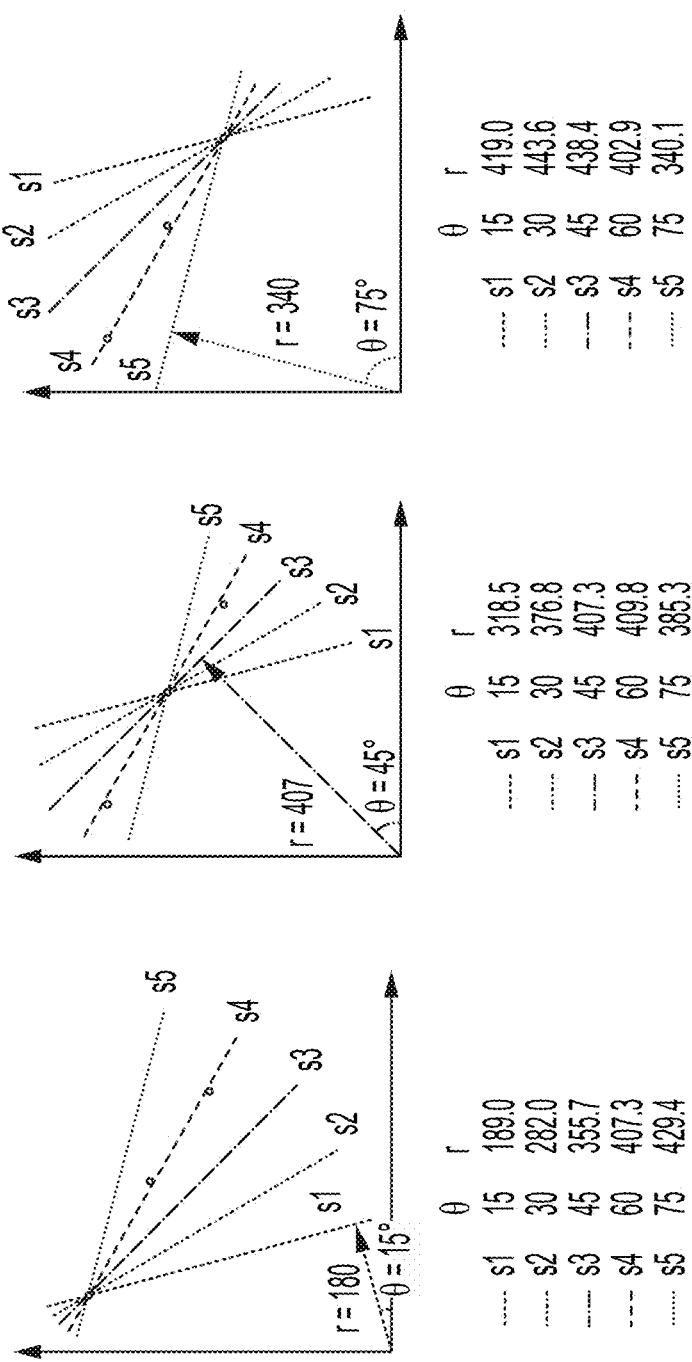
FIGS. 3A-3C illustrate three example (r, θ) data sets for various reference points in Hough space.

FIGS. 3A-3C illustrate (r, θ) values for three reference points in Hough space. For each data point, the (r, θ) values for each reference point are presented for multiple straight lines s1-s5 that pass through the reference point. In this example, for θ=60°, the values for r are most similar to each other. Thus, the system may use an average or other function of the r values for θ=60 as estimates of the Hough parameters for a line that passes through all three of the reference points.

Figure 4:
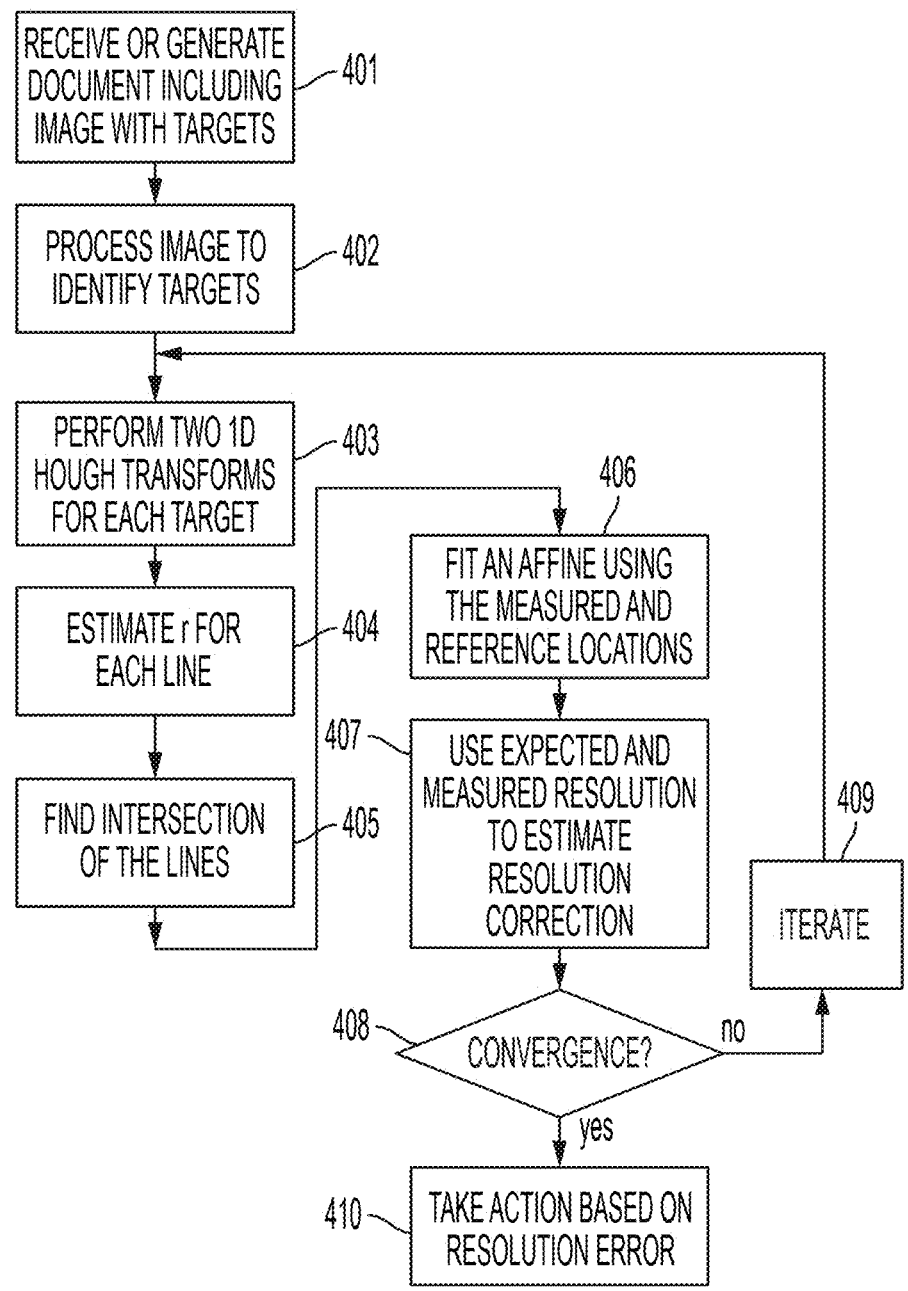
FIG. 4 illustrates a process of identifying and measuring resolution error in a printed document.

FIG. 4 illustrates a process by which a system may use an iterative process of performing 1D Hough transforms on an image to identify and measure errors in resolution of the image. The system may include a processor and a memory that contains programming instructions to implement the steps shown. The processor and memory may be elements of a print device (such as controller 109 of FIG. 1), or they may be separate from the print device and part of a networked system.

When the system receives a print file that includes an image that the print device will render on the substrate, at 401 the system will generate a document that positions multiple targets in the image, each of which is at a known location in the image. Each target may be considered to be a reference point that the system will use when performing the 1D Hough transforms. In some embodiments, each of the targets may be in the form of an "X", as the shape of an X provides an easily recognizable center for the target. However, other target forms that have a clearly identifiable center, such as that of an asterisk may be used. In some embodiments, the system may place at least three such targets in the image.

In some embodiments, the image with the targets may be pre-printed, and instead of printing the document at 401 the system will simply receive the pre-printed document and process it with the following steps.

After the print device prints the image with the targets, at 402 the system will process the printed document to determine whether it exhibits an expected print resolution. To do this, the system will process the image to identify the targets in the image. This may be done by placing the document back into the print device and using the print device's optical sensor (such as optical sensor 109 of FIG. 1) and scan function to process the image and identify the targets. Alternatively, the image may be captured and processed by a different scanning device, by a camera, or by some other image processing device.

Once the targets have been identified, at 403 the system will select a known reference value for θ and perform at least two 1D Hough transforms for each of the targets, at least one of which has uses a θ value that is greater than the reference, and at least one of which uses a θ value that is less than the reference. Each θ value used may be initially estimated as:

$$\theta = \frac{+}{-} \arctan\left(\frac{Y}{X}\right) \quad (5)$$

Figure 5:
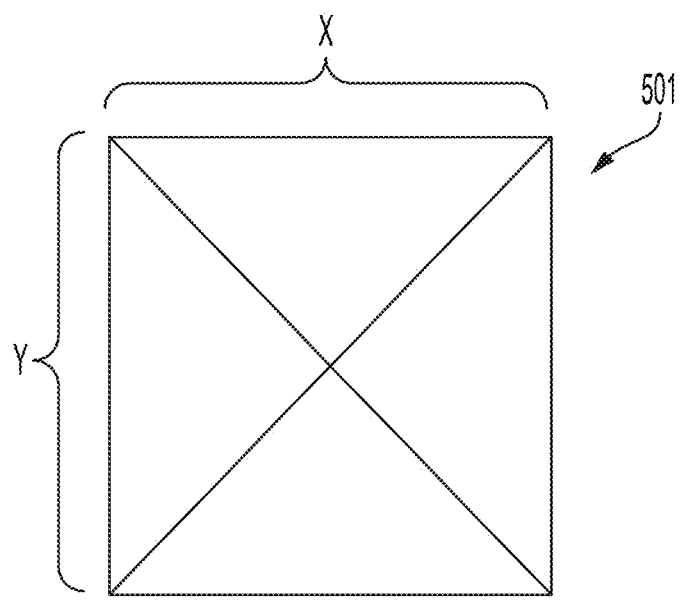
FIG. 5 illustrates an example target for measuring resolution error.

Each 1D Hough transform will generate a set of straight lines (shown by the examples of FIGS. 3A-3C) for each pixel of the target. The angle θ of each line will deviate from an expected θ if the resolution of the printed document deviates from an expected resolution. The number of r values generated using equation (4) above will be equal to the number of pixels used by the transform, which can be numerous. This is shown by way of example in FIG. 5, in which the target 501 is an "X" that is formed of many pixels, each of which has a unique (X, Y) coordinate, and each of which therefore has a unique (r, θ) in Hough space. So, at 404 the system will estimate r for each of the straight lines.

To estimate the r values for each target, in some embodiments a two-histogram method of estimating r may be used to provide computational efficiency. In this process, the system generates a first histogram that identifies the r value that exists with maximum frequency in the r values for the lines generated for the target (as shown by way of example in FIGS. 6A and 7A). Then, the system generates a second histogram that includes the maximum frequency r value from the first histogram and the r values of its neighboring bins (as shown by way of example in FIGS. 6B and 7B). In this context "neighboring" bins include, at a minimum, those that are adjacent. In some embodiments, neighboring bins also may include all bins within a defined range on each side of a bin, such as the two bins on each side or three bins on each side, In some embodiments, the maximum frequency may be a characteristic for multiple bins, and if so the system may average the values of "neighboring" bins that include all bins between those that appear with maximum frequency plus the values for one bin on each side of the range. By way of example, in FIG. 7B bins [2.5, 3] and [3, 3.5] both have a maximum frequency of 100. In this case, the neighboring bins would include bins [2, 2.5] and [3, 3.5]

FIGS. 6A and 6B show an example of two histograms in which no noise (i.e., no resolution error) is present in the image. Thus, the vast majority of r values in the histogram of FIG. 6A are consistent with each other, and the r value that appears with maximum frequency dominates the other r values. FIGS. 7A and 7B show an example if two histograms where there is noise (resolution error and/or speckle noise) in the image. Thus, in FIGS. 7A and 7B, many other r values exist that surround the r value of maximum frequency.

To estimate the ultimate r value, the system will do so using a function of the r values of the mode bin(s) (i.e., that or those of highest values) and the r values of neighboring bins. For example, the function may be one that determines the mean of all such r values.

With the estimate of r, the slope and intercept of the line can be determined using the known slope-intercept formula y=mx+b in which the slope of the line is m, as equation (4) above can also be viewed as:

$$y = \frac{r - x\cos\theta}{\sin\theta} \quad (6)$$

For the y-intercept, at which the y-coordinate is b and the x-coordinate is 0 (i.e., coordinates of (0, b))):

$$b = \frac{r}{\sin\theta} \quad (7)$$

and $$m = \frac{y_2 - y_1}{x_2 - x_1} \quad (8)$$

When $y_1$ and $x_1$ are the origin:

$$m = \frac{y_2}{x_2} \quad (9)$$

Which is known to be tan θ from equation (5) above. Also, the angle of the line is orthogonal to θ:

$$\Theta_{line} = \theta + 90° \quad (10)$$

Therefore:

$$b = \frac{r}{\cos\theta} \quad (11)$$

[Does equation (11) conflict with equation (7)?]
and $$m = -\cot\theta \quad (12)$$

Returning to FIG. 4, once the intercepts and slopes for the lines at +0 are determined, at 405 the system will calculate the intersection point of the lines to be the identified center of the target. For example, if the target is two lines in the shape of an "X", the intersections of those lines will be the center. If the target is in the shape of an asterisk (*), the intersection of the asterisk's three (or more) lines will be the center. The system may repeat this for each target in the image.

The system then uses the measured center locations of each target and the expected center locations for each point to fit an affine transformation (at 406) that measures a distance and/or other difference between the expected target center location and the measured target center location. An affine transformation is a geometric transformation that will estimate how to translate, scale, rotate, and/or shear the measured data points to become the reference points. The y-scaling from the affine transformation is then used to estimate resolution correction at 407 as:

$$\text{resolution}_{correct} = \text{resolution}_{expected} - (Y_{scaling} - 1) * \text{resolution}_{expected} \quad (13)$$

In equation (13), $\text{resolution}_{expected}$ is a previously known value, and is the nominal resolution from the print device. $Y_{scaling}$ is from the affine transformation. The affine transformation will provide a matrix that transforms the measured point coordinates to a reference (i.e. points in the digital image).

If there is noise in the resolution, the value of θ used in the Hough equation will be slightly off, and this results in a degraded estimate for the measured resolution. Thus, the system may iterate (at 409) by repeating steps 403-407 until the $\text{resolution}_{correct}$ value converges around a single value at 408. By estimating a correction and iterating until convergence, the estimate of θ will improve and the resolution correction term will become close to zero.

Once the system values have converged and the system has measured the resolution error, at 410 the system may take action such as report the resolution error on a display or printed error report, adjust one or more parameters of operation of the print device, adjust an image registration calculation for the print device, or other actions. For example, the system may adjust a print resolution setting by changing ink jet firing speed or transport mechanism movement speed of the printer.

To determine variations in print speed, the system may print the image with targets at 401 and then scan it using a separate camera or other device to generate a scan which the system will process at 402. To determine variations in scan speed, the system may receive a pre-printed document with targets and 401 and then use the print device's scanner to generate the scan that the system will process at 402.

By using an iterative 1D Hough transform and not other methods such as a two-dimensional (2D) Hough transform, the process described in this document can require much less processing capacity. 2D Hough transforms require a significant amount of processing steps, and when an image is large and/or has a large range of r, 0 values, the process can be computationally expensive. Thus, the presently disclosed methods may be implemented more quickly and/or may be require less powerful processors than if 2D Hough transforms were used.

The inventors have found the methods described above to be particularly useful to identify resolution error in inkjet print devices such as those described above in the discussion of FIG. 1. However, the methods also may be used to identify resolution error in other types of print devices, such as laser printing devices, solid ink printers, thermal printing devices, and 3D printers.

Figure 8A:
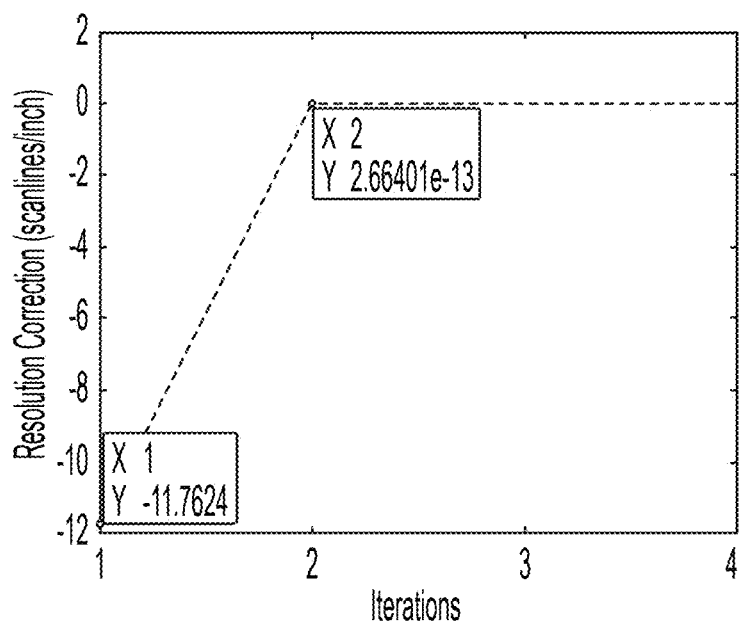
FIGS. 8A and 8B illustrates example resolution correction calculations.
Figure 8B:
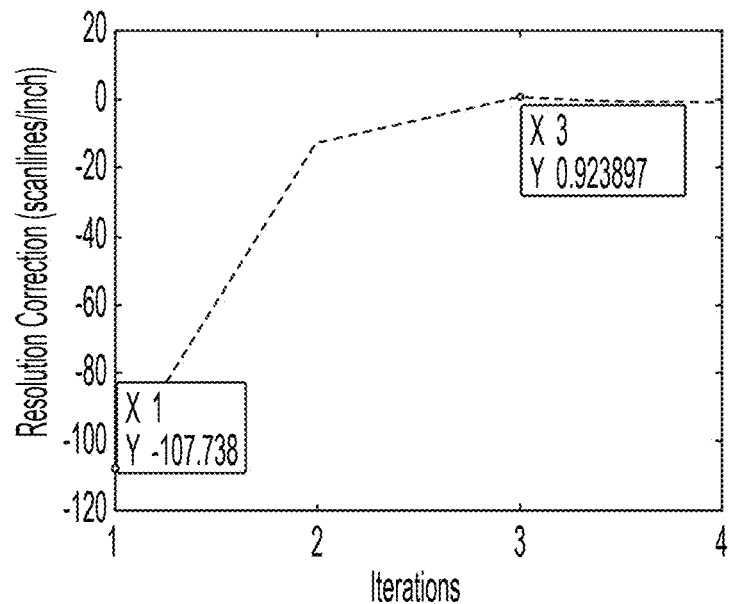

FIGS. 8A and 8B illustrate example resolution correction results in an image processed using the methods described in this document. In this example, six "X" targets are printed onto a document by a print device that operates with an expected resolution of 1200 scanlines/inch in the X and Y. Resolution noise of 1% and 10% is injected into the measurements which yields an error of about 12 and 120 scanlines per inch, respectively. FIG. 8A shows that with a resolution noise of 1% the system may converge within a single iteration while with a larger noise of 10% it takes two iterations as shown in FIG. 8B.

Figure 9:
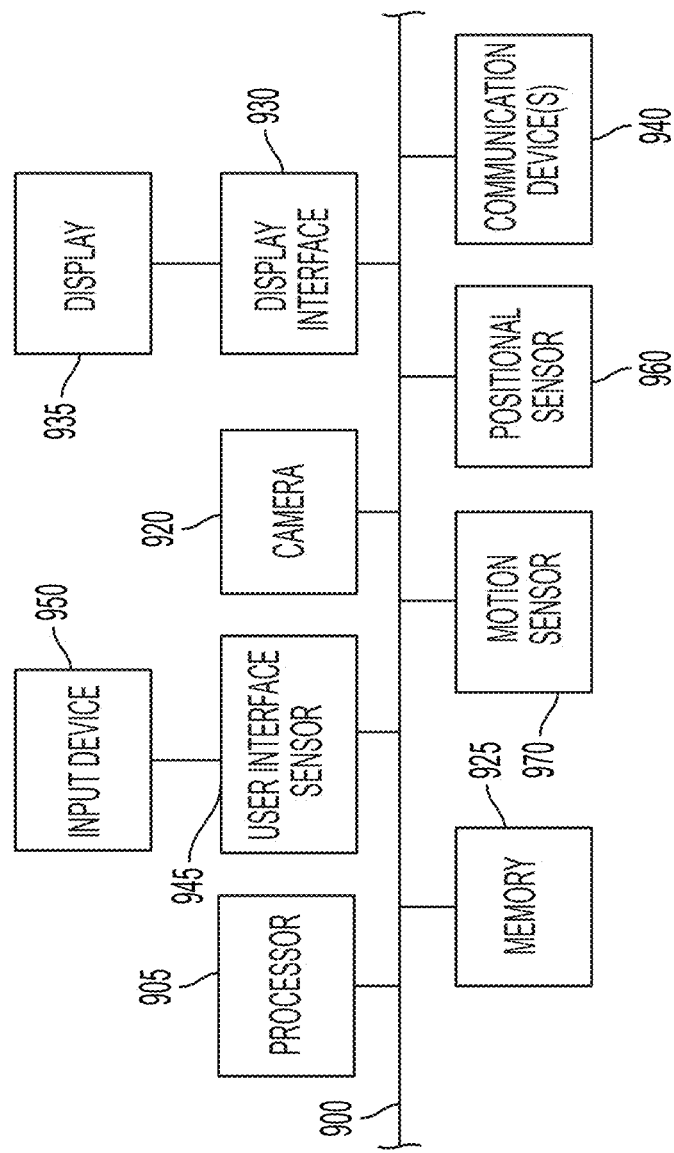
FIG. 9 illustrates example elements of a computing device.

FIG. 9 depicts an example of internal hardware that may be included in any of the electronic components of the system, such as the computing device of the print device, or of a computing device that is communicatively connected to the print device. An electrical bus 900 serves as a communication path via which messages, instructions, data, or other information may be shared among the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored.

An optional display interface 930 may permit information from the bus 900 to be displayed on a display device 935 in visual, graphic or alphanumeric format. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication systems. The communication device 940 may be configured to be communicatively connected to a communications network, such as the Internet, a local area network or a cellular telephone data network.

The hardware may also include a user interface sensor 945 that allows for receipt of data from input devices 950 such as a keyboard, a mouse, a joystick, a touchscreen, a touch pad, a remote control, a pointing device and/or microphone. Digital image frames also may be received from a camera 920 (i.e., an optical sensor that can capture video and/or still images). The system also may include a positional sensor 960 and/or motion sensor 970 to detect position and movement of the device. Examples of motion sensors 970 include gyroscopes or accelerometers. Examples of positional sensors 960 include a global positioning system (GPS) sensor device that receives positional data from an external GPS network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 9.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

As used in this document, the term "print device" is a device that is configured to perform printing based on digital data, or a multi-functional device in which one of the functions is printing based on digital data along with other functions such as scanning or faxing. Example components of a print device include a print head, which may include components such as a print cartridge containing ink, toner or another print material, as well as a document feeding system configured to pass a substrate through the print device so that the print head can print characters and/or images on the substrate.

In this document, the term "communication path" means a wired or wireless path via which a first device sends communication signals to and/or receives communication signals from one or more other devices. Devices are "communicatively connected" if the devices are able to send and/or receive data via a communication oath. "Electronic communication" refers to the transmission of data via one or more signals sent along a communication path between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

As described above, this document discloses system, method, and computer program product embodiments for implementing a hybrid spreadsheet and coding environments. The system embodiments include a local computing device, which may have access to one or more remote computing devices. In some embodiments, one or more of the remote computing devices also may be part of the system. The computer program embodiments include programming instructions, stored in a memory device, that are configured to cause a processor to perform the methods described in this document.

Without excluding further possible embodiments, certain example embodiments are summarized in the following paragraphs.

In a first embodiment, a method for identifying resolution error in a print device includes, by a processing device: (a) processing a scan of a document comprising an image with a plurality of targets printed at known reference locations on a substrate; (b) locating the targets in the image; (c) for each of the targets, performing a 1D Hough transform process that comprises performing a plurality of 1D Hough transformations to generate a plurality of lines, identifying a location where the plurality of lines intersect, measuring a difference between the identified location and a reference location, wherein the reference location is an expected location for the target, using the difference to measure a resolution of the image, and estimating an error value between the measured resolution and an expected resolution of the image; and (d) using the estimated error value to estimate a resolution error of a print device that printed the document.

Optionally, the embodiment above may further comprise using the reported resolution error to adjust a parameter of operation of the print device.

Optionally, either of the embodiments above may further comprise, by one or more print heads of the print device, printing the image with the plurality of targets at the known reference locations on the substrate.

Optionally, any of the embodiments above may further comprise, by an optical sensor of the print device. generating the scan of the document after the one or more print heads of the print device print the image on the substrate.

Optionally, in any of the embodiments above: (a) identifying the location where the plurality of lines intersect may comprise identifying a center of the target; and (b) the expected location for the target may comprise an expected location for the center of the target.

Optionally, in any of the embodiments above, estimating the error value may comprise repeating the 1D Hough transform process at least once for each of the targets until the process converges on the estimated error value.

Optionally, in any of the embodiments above, measuring the difference between the identified location and the reference location may comprise using an affine transformation to measure the difference.

Optionally, in any of the embodiments above, performing the plurality of 1D Hough transformations to generate the plurality of lines may comprises: (a) identifying a reference θ value; (b) generating a first of the plurality of lines using a 1D Hough transformation with a θ value that is greater than the reference θ value; and (c) generating a second of the plurality of lines using a 1D Hough transformation with a θ value that is less than the reference θ value.

Any of the embodiments above may be implemented in a computer program product comprising a memory device containing programming instructions that are configured to, when executed by a processing device, cause the processing device to implement the process.

Any of the embodiments above also may be implemented by a system comprising a print device comprising one or more print heads and a controller comprising a processor and a memory device, wherein the controller is included in or communicatively connected with the print device, and wherein the memory contains programming instructions that are configured to cause the processor to implement the process of any of the embodiments. Optionally, the system also may include an optical sensor of a scanning device

The invention claimed is:

1. A method for identifying resolution error in a print device, the method comprising, by a processing device:
   processing a scan of a document comprising an image with a plurality of targets printed at known reference locations on a substrate;
   locating the targets in the image;
   for each of the targets, performing a 1D Hough transform process that comprises:
      performing a plurality of 1D Hough transformations to generate a plurality of lines,
      identifying a location where the plurality of lines intersect,
      measuring a difference between the identified location and a reference location, wherein the reference location is an expected location for the target,
      using the difference to measure a resolution of the image, and
      estimating an error value between the measured resolution and an expected resolution of the image; and
   using the estimated error value to estimate a resolution error of a print device that printed the document.

2. The method of claim 1, further comprising using the reported resolution error to adjust a parameter of operation of the print device.

3. The method of claim 1 further comprising, by one or more print heads of the print device, printing the image with the plurality of targets at the known reference locations on the substrate.

4. The method of claim 1 further comprising, by an optical sensor of the print device, generating the scan of the document after the one or more print heads of the print device print the image on the substrate.

5. The method of claim 1, wherein:
identifying the location where the plurality of lines intersect comprises identifying a center of the target; and
the expected location for the target comprises an expected location for the center of the target.

6. The method of claim 1, wherein estimating the error value comprises repeating the 1D Hough transform process at least once for each of the targets until the process converges on the estimated error value.

7. The method of claim 1, wherein measuring the difference between the identified location and the reference location comprises using an affine transformation to measure the difference.

8. The method of claim 1, wherein performing the plurality of 1D Hough transformations to generate the plurality of lines comprises:
identifying a reference $\theta$ value;
generating a first of the plurality of lines using a 1D Hough transformation with a $\theta$ value that is greater than the reference $\theta$ value; and
generating a second of the plurality of lines using a 1D Hough transformation with a 0 value that is less than the reference $\theta$ value.

9. A computer program product comprising a non-transitory memory device containing programming instructions that are configured to, when executed by a processor, cause the processor to:
process a scan of a document comprising an image with a plurality of targets printed at known reference locations on a substrate;
locate the targets in the image;
for each of the targets, perform a 1D Hough transform process that comprises:
performing a plurality of 1D Hough transformations to generate a plurality of lines,
identifying a location where the plurality of lines intersect,
measuring a difference between the identified location and a reference location, wherein the reference location is an expected location for the target,
using the difference to measure a resolution of the image, and
estimating an error value between the measured resolution and an expected resolution of the image; and
use the estimated error value to estimate a resolution error of a print device that printed the document.

10. The computer program product of claim 9, further comprising instructions to use the reported resolution error to adjust a parameter of operation of the print device.

11. The computer program product of claim 9, further comprising instructions to cause one or more print heads of the print device to print the image with the plurality of targets at the known reference locations on the substrate.

12. The computer program product of claim 9, further comprising instructions to cause an optical sensor of the print device to generate the scan of the document after the one or more print heads of the print device print the image on the substrate.

13. The computer program product of claim 9, wherein:
the instructions to identify the location where the plurality of lines intersect comprises identifying a center of the target; and
the expected location for the target comprises an expected location for the center of the target.

14. The computer program product of claim 9, wherein the instructions to estimate the error value comprise instructions to repeat the 1D Hough transform process at least once for each of the targets until the process converges on the estimated error value.

15. The computer program product of claim 9, wherein the instructions to measure the difference between the identified location and the reference location comprise instructions to use an affine transformation to measure the difference.

16. The computer program product of claim 9, wherein the instructions to perform the plurality of 1D Hough transformations to generate the plurality of lines comprise instructions to:
identify a reference $\theta$ value;
generate a first of the plurality of lines using a 1D Hough transformation with a $\theta$ value that is greater than the reference $\theta$ value; and
generate a second of the plurality of lines using a 1D Hough transformation with a 0 value that is less than the reference $\theta$ value.

17. A system comprising:
a print device comprising one or more print heads; and
a controller comprising a processor and a memory device, wherein the controller is included in or communicatively connected with the print device,
wherein the memory contains programming instructions that are configured to, when executed by the processor, cause the processor to:
process a scan of a document comprising an image with a plurality of targets printed by the print device at known reference locations on a substrate;
locate the targets in the image;
for each of the targets, perform a 1D Hough transform process that comprises:
performing a plurality of 1D Hough transformations to generate a plurality of lines,
identifying a location where the plurality of lines intersect,
measuring a difference between the identified location and a reference location, wherein the reference location is an expected location for the target,
using the difference to measure a resolution of the image, and
estimating an error value between the measured resolution and an expected resolution of the image; and
use the estimated error value to estimate a resolution error of the print device.

18. The system of claim 17, further comprising instructions to use the reported resolution error to adjust a parameter of operation of the print device.

19. The system of claim 17, further comprising instructions to cause one or more of the print heads to print the image with the plurality of targets at the known reference locations on the substrate and wherein:
the print device also comprises an optical sensor; and the instructions further comprise instructions to cause the optical sensor to generate the scan of the document after the one or more print heads print the image on the substrate.

20. The system of claim 17, wherein the instructions to estimate the error value comprises repeating the 1D Hough transform process at least once for each of the targets until the process converges on the estimated error value.

\* \* \* \* \*